United States Patent [19]

Veiga et al.

[11] Patent Number: 5,622,662
[45] Date of Patent: Apr. 22, 1997

[54] METHOD FOR FORMING A SOUND ATTENUATION COMPOSITE

[75] Inventors: Manuel J. Veiga, Tewksbury; Richard J. Satin, Swampscott, both of Mass.

[73] Assignee: Bradford Industries, Inc., Lowell, Mass.

[21] Appl. No.: 469,102

[22] Filed: Jun. 6, 1995

Related U.S. Application Data

[62] Division of Ser. No. 127,645, Sep. 28, 1993, abandoned.

[51] Int. Cl.⁶ .......................... B29C 44/06; B29C 44/12
[52] U.S. Cl. .................. 264/45.3; 264/46.4; 264/50; 264/255; 264/DIG. 6; 156/247
[58] Field of Search .................... 264/45.3, DIG. 6, 264/255, 46.4, 46.6, 50; 156/247

[56] References Cited

U.S. PATENT DOCUMENTS

| | | |
|---|---|---|
| Re. 29,487 | 12/1977 | Gardner, Jr. . |
| 3,652,062 | 3/1972 | Baker . |
| 3,881,569 | 5/1975 | Evans, Jr. . |
| 3,885,008 | 5/1975 | Martin ..................... 264/46.4 |
| 3,959,191 | 5/1976 | Kehr et al. . |
| 3,996,654 | 12/1976 | Johnson ................... 264/45.3 |
| 4,013,810 | 3/1977 | Long ................... 264/DIG. 6 |
| 4,018,957 | 4/1977 | Werner et al. . |
| 4,035,215 | 7/1977 | Goldstone . |
| 4,038,238 | 7/1977 | Cravens . |
| 4,056,161 | 11/1977 | Allen, Jr. . |
| 4,079,162 | 3/1978 | Metzger ................... 428/312 |
| 4,110,510 | 8/1978 | Oliveira . |
| 4,154,537 | 5/1979 | Kress . |
| 4,164,375 | 8/1979 | Allen . |
| 4,191,798 | 3/1980 | Schumacher et al. . |
| 4,231,666 | 11/1980 | Baron . |
| 4,250,136 | 2/1981 | Rex ................... 264/DIG. 6 |
| 4,272,558 | 6/1981 | Bouette . |
| 4,340,129 | 7/1982 | Salyers . |
| 4,367,259 | 1/1983 | Fulmer et al. . |
| 4,379,190 | 4/1983 | Schenck . |
| 4,419,457 | 12/1983 | Tokunaga ................... 521/65 |
| 4,438,228 | 3/1984 | Schenck . |
| 4,488,619 | 12/1984 | O'Neill . |
| 4,746,684 | 5/1988 | Kuriyama et al. .......... 521/137 |
| 4,774,794 | 10/1988 | Grieb ..................... 52/309.7 |
| 4,818,603 | 4/1989 | Mueller . |
| 5,068,902 | 11/1991 | Ward . |
| 5,106,547 | 4/1992 | Beck et al. .............. 264/46.6 |
| 5,116,557 | 5/1992 | Debaes et al. ............ 264/255 |
| 5,203,352 | 4/1993 | Gardner, Jr. . |
| 5,269,986 | 12/1993 | Eisen et al. .............. 264/46.6 |

FOREIGN PATENT DOCUMENTS

| 2235641 | 2/1973 | Germany ................... 264/45.3 |
|---|---|---|

*Primary Examiner*—Allan R. Kuhns
*Attorney, Agent, or Firm*—Dilworth & Barrese

[57] ABSTRACT

The present invention relates to a sound attenuation composite and a method for making the composite. The sound attenuation composite includes a barrier layer and an open cell foam layer loaded with a sound blocking filler. In one embodiment, the foam layer is filled with a barium sulfate filler. In another embodiment, a solid polyvinyl chloride barrier layer is loaded with barium sulfate, wherein 60 parts of barium sulfate is present in each 100 parts of polyvinyl chloride.

8 Claims, 3 Drawing Sheets

METHOD FOR FORMING A SOUND ATTENUATION COMPOSITE

This is a divisional of application Ser. No. 08/127,645, filed Sep. 28, 1993, now abandoned.

BACKGROUND OF THE INVENTION

1. Field of the Invention

The present invention relates to an environmentally improved energy absorbing, damping and blocking sound barrier composite which replaces lead and other synthetic barriers and the process for making same. More particularly, the present invention relates to sound attenuation composites having a dense, resilient, elastic polymer barrier layer and a dense, resilient, elastic fractured open cell foam layer formed in one process.

2. Description of the Related Art

Sound absorption barriers have been utilized to reduce noise levels in work areas, such as, areas having manufacturing machinery and construction equipment. Sound barrier materials have been made by incorporating sound blocking heavy particles into polymer binders. For example, U.S. Pat. No. 4,110,510 to Oliveira discloses a sound barrier material with a polyvinyl chloride impregnated mesh sheet having a coating of a chlorinated polyethylene containing barium sulfate. The concentration of barium sulfate in the chlorinated polyethylene binder is 50–200 parts of barium sulfate in each 100 parts of chlorinated polyethylene. This coated sheet is laminated to two sides of an intermediate foam layer to form the sound barrier.

U.S. Pat. No. 4,818,603 to Mueller discloses a thermal-acoustic insulating material which is fabricated by bonding a thin heavy metal-loaded polyorganophosphazen septum to the surface of a foamed polyamide insert. As another example, U.S. Pat. No. 4,367,259 to Fulmer et al. discloses a sound deadening material which is obtained by mixing sound dampening materials with water and bonding them together by adding a water-miscible isocyanate-terminated prepolymer which reacts with the water to form a crosslinked binder.

The present invention provides a sound attenuation composite having superior sound absorption, damping and blocking characteristics and accomplishes these tasks with an extremely lightweight construction. In particular, a sound attenuation composite is provided having superior sound attenuation characteristics at low cost and at approximately one half the weight in comparison to known sound barriers, e.g., a lead sheet.

SUMMARY OF THE INVENTION

The present invention relates to a sound attenuation composite which includes a barrier layer and an open cell foam layer. Due to the unique chemistry and processing of the composite, the fractured irregular open cell structure absorbs, traps, blocks and dissipates sound energy. In the preferred embodiment the barrier layer includes a solid polyvinyl chloride (PVC) polymer layer loaded with barium sulfate, wherein 60 parts of barium sulfate is present in each 100 parts of PVC polymer. The open cell foam layer is loaded with barium sulfate and glass microsphere filler as well as other additives that work together to improve sound attenuation and flammability performance. Alternatively, the barrier layer may be constructed from a polymer selected from the group consisting of polyesters, polyethers, polyurethane, polyamides and polyethylene and the open cell foam layer may be constructed from a polymer selected from the group consisting of polyurethane, silicone, nitrile, polyesters, polyethers, polyamides and polyethylene. To provide a distinctive appearance both of the layers of the sound attenuation composite may be formulated with pigment.

The sound attenuation composite of the present invention may include a decoupling layer affixed to the open cell foam layer. The decoupling layer separates vibration energy from sound energy so that the sound energy passes therethrough and enters the open cells of the open cell foam layer. Generally, the decoupling layer reduces the sound energy by at least 1 db.

In an alternative embodiment, the sound attenuation composite of the present invention may include a reinforcing layer positioned adjacent the open cell foam layer. The reinforcement is provided to strengthen the open cell foam layer and preferably includes a woven fabric bonded to the open cell foam layer. The reinforcing layer may be a woven, non-woven or knitted textile made out of various fibers such as cotton, fiberglass, polyester, acrylic, nylon and other hybrid fibers. In addition other reinforcements may be used such as films, other composites, steel, aluminum and plastic sheets.

Another alternative construction for the sound attenuation composite of the present invention includes a combination of a layer of polymeric open cell foam having a similar fractured irregular open cell structure as the foam described above which is secured to a support member such that when sound energy passes through the open cell foam, the support member reflects the sound energy into the open cell foam layer for further damping and absorption of the sound energy.

The present invention also relates to a method for forming a sound attenuation composite which includes casting a solid polymer barrier layer on release paper, forming an irregular polymer open cell foam layer, casting the open cell foam layer onto the solid barrier layer, and fusing the open cell foam layer to the barrier layer to form the sound attenuation barrier composite. Once fused the layers are cooled and the composite is removed from the release paper. To provide structural reinforcement, a reinforcing layer may be cast onto the open cell foam layer prior to fusing the open cell foam layer to the barrier layer which dimensionally stabilizes the composite. To provide additional sound absorption capabilities, a decoupling layer may be affixed to the open cell foam layer during the casting process for separating vibration energy from sound energy.

DETAILED DESCRIPTION OF THE PREFERRED EMBODIMENTS

Figure 1:
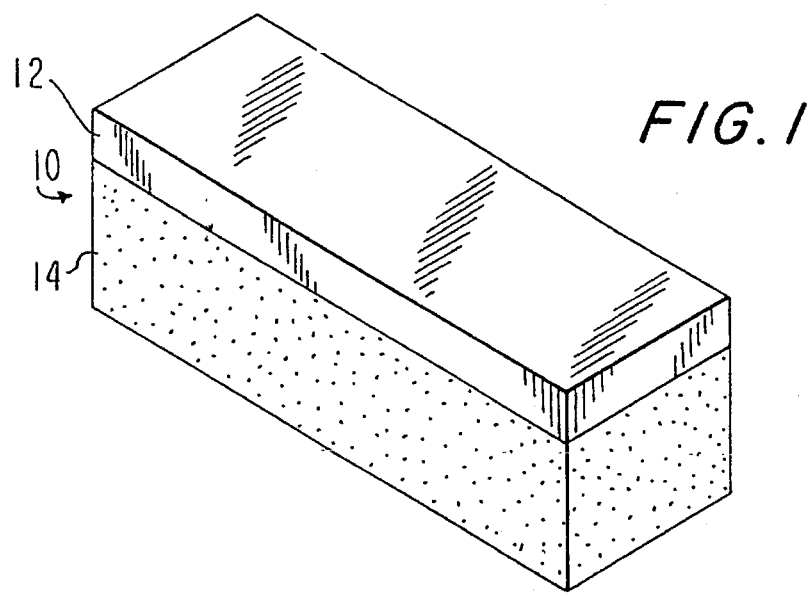
FIG. 1 is a perspective view of one preferred embodiment of a sound attenuation composite of the present invention, illustrating a polyvinyl chloride barrier layer and an open cell foam layer.
Figure 2:
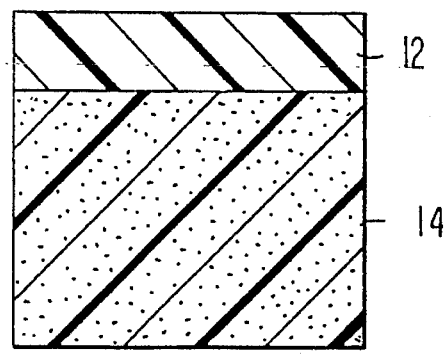
FIG. 2 is a cross-sectional view of the composite of FIG. 1.
Figure 4:
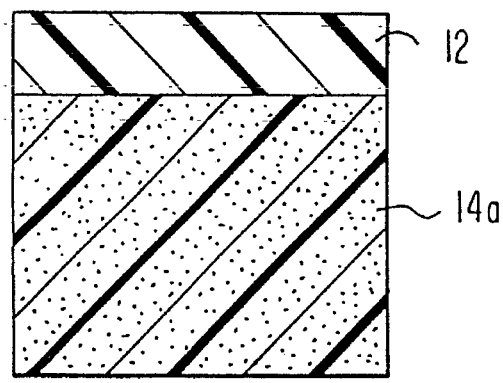
FIG. 4 is a cross-sectional view of another alternative embodiment for the composite of the present invention, illustrating a polyvinyl chloride barrier layer and an open cell foam layer.

A preferred embodiment of the composite sound attenuation barrier of the present invention is shown in FIGS. 1, 2 and 4. As shown, the composite sound attenuation barrier 10 includes a solid polymer barrier layer 12 and a polymer open cell foam layer 14 having a fractured open cell structure to absorb, trap, block and dissipate sound energy, which are preferably fused together at a temperature of between about 325° F. and about 525° F.

The barrier layer may range between about 2 mils and about 160 mils in thickness, but preferably is between about 17 and about 20 mils in thickness. The barrier layer can be formed from polymer material such as PVC, polyurethane, silicone rubber or natural rubber and is loaded with sound blocking filler material which has sound absorption or deadening characteristics. In this regard, the barrier layer is preferably a barium sulfate ($BaSO_4$) filled polymer using PVC as its primary carrier or binder. However, other polymers may be used for the barrier layer, such as polyesters, polyether, polyamides, polyethylene or the like. Although barium sulfate is the preferred filler, other fillers, which may be used include calcium carbonate, calcium sulfate, hydrated alumina, clay, magnesium carbonate, silica, flyash, cement dust, wood flour, ground rice hulls or mixtures thereof. The concentration of filler material in the polymer can be between about 50 to about 200 parts per 100 parts of polymeric material and is preferably about 60 to about 70 parts of filler per 100 parts of polymeric material.

The thickness of the open cell foam layer ranges between the 20 mils and about 850 mils, but is preferably between about 40 and about 160 mils in thickness. This open cell foam layer preferably has a sound blocking filler incorporated therein which makes the cell walls of the open cell foam dense and causes sound to be blocked and reflected off the cell walls so that the damping action of this resilient, elastic cell wall can further dissipate the sound energy. The concentration of sound blocking filler, e.g., barium sulfate, in the foam component is between about 60 parts and about 200 parts of filler in 100 parts of foam and is preferably about 60 parts and about 70 parts of filler in 100 parts of foam. The open cell foam layer can be fabricated from the same polymers enumerated above with respect to the barrier layer, as well as polyurethanes and is preferably fabricated from a polymer such as polyvinyl chloride, polyvinyl chloride hybrids, silicone rubber, nitrile or the like. The incorporation of glass microspheres as a filler for the foam has been found to reduce the weight of the composite of the present invention in comparison to other noise abatement materials presently available. To illustrate, similar noise attenuation characteristics as those provided by lead are achieved by the present invention with an approximately 50 percent reduction of weight of the composite in comparison to a lead barrier for the same sound attenuation performance.

Generally, the performance standard for the noise attenuation characteristics of a material is referenced to lead, i.e., 1 lb. per sq. ft. of lead. Generally, a material is considered to have sufficient noise attenuation characteristics when the noise attenuation corresponds to the noise attenuation provided by one square foot of lead weighing one pound (i.e., 1 lb. per sq. ft.). The sound attenuation composite of the present invention achieves substantially the "1 lb. per sq. ft." of lead noise abatement characteristic with a composite weighing approximately 50 percent of the weight of lead. Accordingly, when the weight of the sound attenuation composite is equal to that of lead, the noise reduction is greatly increased.

Figure 6:
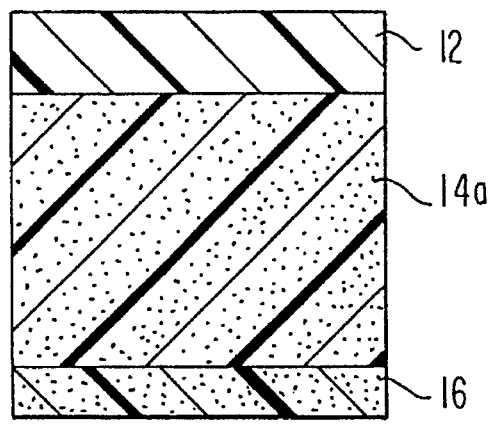
FIG. 6 is a cross-sectional view of another composite similar to FIG. 4, illustrating a closed or open cell polyurethane foam decoupling layer bonded to the open cell foam layer.

To further increase the noise attenuation factor, a decoupling layer 16, shown in FIG. 6, is affixed to the open cell foam layer, such as by fusing or bonding. Preferably, the decoupling layer is a polymer foam, such as polyester, polyether, polyurethane or polyvinyl chloride which separates or filters vibration energy from sound energy such that the sound energy is allowed to pass through the decoupling layer and enter the open cell foam layer for absorption, damping, blocking and dissipation of the sound energy. The decoupling layer has thickness of between about 150 mils and about 2000 mils. The decoupling layer according to the above described construction provides at least one decibel (i.e., 1 db) of noise reduction at about one-quarter inch thickness.

Figure 3:
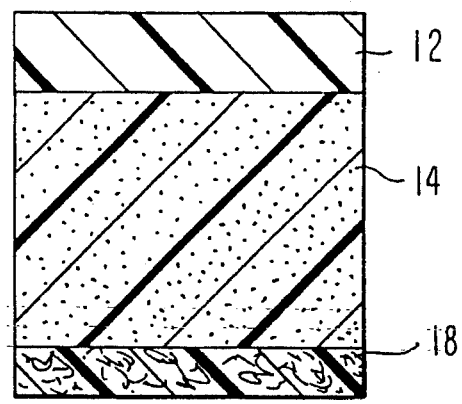
FIG. 3 is a cross-sectional view of an alternative construction of the composite of FIG. 1 having a fiberglass textile non-woven polyester scrim reinforcement layer bonded to the open cell foam layer.
Figure 5:
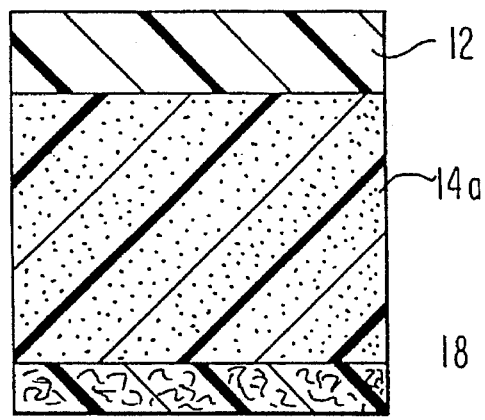
FIG. 5 is a cross-sectional view of another composite similar to FIG. 4, illustrating a fiberglass textile woven polyester scrim reinforcement layer laminated to the open cell foam layer.

The composite of the present invention can also be constructed utilizing a woven, non-woven or knitted reinforcing fabric 18, shown in FIGS. 3 and 5 in the form of a roll or sheet which stabilizes the composite dimensionally and reinforces the open cell foam layer. In certain instances, a woven or nonwoven fiberglass material may be used to provide a flame retardant reinforcement layer having high heat resistance. The stability of the composite of the present invention is increased when the reinforcing layer is cast onto the open cell foam layer prior to fusing the barrier layer to the open cell foam layer. However, the reinforcing layer may be bonded to the open cell foam layer with a suitable adhesive after the fusion state. In this regard, the reinforcing layer can be a knitted, woven or non-woven textile or scrim and has a thickness of between about 5 mils and about 500 mils.

The construction of the sound attenuation composite of the present invention is based on a combination of physical principles, including mass barrier laws, acoustical damping laws, shock and isolation laws, and the absorption law to achieve a combination of the desired noise attenuation characteristics. The present invention incorporates some or all of these principles into its composite and provides a sound attenuation composite having exceptional acoustical insulation and damping properties at low, as well as high, frequencies.

The open cell foam layer is formed so that the cells interconnect (and are open) and are fractured throughout the layer which causes the sound energy to travel and retravel through the maze of cells as the sound waves are reflected off the dense cell walls. When a sound wave enters a porous material (e.g., a barium sulfate and glass microsphere filled open cell foam) the amplitude of vibration of the air molecules is progressively damped out by friction against the surface of the cell walls. The noise energy absorbing, damping and blocking properties of the open cell foam layer of the present invention can be modified by altering the thickness, porosity, cell structure and/or the density of the open cell foam layer, as well as the amount of barium sulfate and glass microspheres and other additives incorporated therewithin. For example, the embodiments shown in FIGS. 1–3, include a 30 pounds per cubic foot (pcf) polymer foam 14 and the embodiments of FIGS. 4–6 include an 85 pcf polymer foam 14a. The cell structure and connection channels or openings therebetween are controlled by the introduction of air mechanically into the polymer form formulation, e.g., the foam is mechanically frothed, as will be described in more detail below.

Preferably, the open cell foam layer is loaded with a high strength glass microsphere filler which displaces the PVC polymer to form a lighter weight open cell foam layer as well as providing sound attenuation capabilities as described below. During the processing of the composite of the present invention, e.g., fusing the barrier layer to the open cell foam layer, the composite may be subjected to temperatures in excess of 450° F. Accordingly, the glass microsphere are preferably produced to withstand temperatures in excess of 450° F. A suitable composition for each glass microsphere is a microsphere composed of water insoluble chemically stable soda-lime borosilicate glass.

The open cell construction of the sound attenuation composite of the present invention, exhibits lower temperature flexibility and volume resistivity, and inversely to modulus, strength, elongation, permanent set in the tensile test, rebound resilience, and abrasion resistance when compared to closed cell polyvinyl chloride foams that have been chemically blown. To provide the above described layers with a distinctive appearance, pigment may be added to each layer.

In operation, sound energy enters into the open cells of the open cell foam layer so that the amplitude of vibration of the air molecules is progressively dampened by friction of the air molecules (sound energy) against the surface of the cell walls. Thus, the open cell construction allows the foam to absorb and dampen sound energy. If a decoupling layer is utilized, vibration and sound energy will be separated so that the sound energy is allowed to pass therethrough and enter the open cells of the open cell foam layer.

Sound energy which passes through the open cell foam layer strikes the cell walls which are dense and irregularly shaped and which cause the sound energy to undergo mode conversion and to be reflected off the dense, resilient, elastic cell wall and to continue to rebound continuously until they find their way out through the opening in the cell into the interconnected adjacent cell. The continuous rebound, reflection effect and the damping action of the dense, resilient, elastic cell walls dissipate the sound waves as they travel from cell to cell in an irregular path. This continues until the sound energy strikes the solid, dense, resilient elastic barrier layer and is then reflected or blocked back into the open cell layer, where mode conversion and damping action starts over again and further dissipates the noise energy. As noted above, the open cell foam layer is preferably filled with a high strength, high heat resistant glass microsphere filler. In addition to providing light-weight construction for the open cell foam layer, the glass microspheres are often fractured during the manufacturing process to form an additional level of discontinuous and enlarged surface area in the cell walls which add to the composite's ability to dissipate sound energy.

The present invention also relates to a process for making the composite sound attenuation barrier of the present invention. Preferably, the polymer used for the open cell foam layer is compounded so that it is suitable for mechanical frothing. Typically, this involves using a surfactant, viscosity depressant silicone added to the plastisol to provide the required physical properties for mechanical frothing.

Initially, the raw materials utilized to form the open cell foam layer are mixed uniformly with the exception of the silicon surfactant which is mixed prior to frothing to form a uniform polymer paste. The paste is then frothed in a mechanical frothing machine to a desired density in the range of 15 lbs/ft$^3$ to 95 lbs/ft$^3$, but preferably between about 30 lbs/ft$^3$ and about 60 lbs/ft$^3$. Typically, the paste is pumped into the mixer at a predetermined rate, e.g., between about 20 pounds per cubic foot and about 60 pounds per cubic foot to form the foam. Air or other gas suitable for frothing, is introduced into the paste at a predetermined rate to form the open cell foam. The rate is determined by such factors as the desired thickness of the product, the production line speed and the weight of the product. To achieve the desired irregular open cell structure, the open cell foam is mixed by a foamer head in the mixer rotating at a predetermined rate of between about 100 rpm and about 1500 rpm. The size of the irregular cell structure is dependent on various factors, such as the speed of the foamer head, the thickness or gauge of the open cell foam and the density of the open cell foam. In general, however, the slower the speed of the foamer head the larger and more irregular the cells that are formed. An exemplary mixer for such mechanical frothing is the Oakes Mixer, manufactured by Oakes Machine Corp. of New York. Other suitable mixing machines are contemplated.

When the open cell foam layer is frothed, the barrier layer, e.g., polyvinyl chloride filled with barium sulfate is cast onto a release paper or belt or can be direct coated on to a textile carrier (woven or non-woven) until the desired thickness is achieved, e.g., 17–20 mils. The mechanically frothed open cell foam layer is then cast over the barrier layer until the desired thickness is achieved. The barrier layer along with the open cell foam barrier layer are then fused in an oven at a temperature of between about 375° F. and about 425° F. for a time of about 1.5 minutes to about 5 minutes. The thickness and density of each layer determines the preferred temperature for fusing the two layers.

If a reinforcing layer is desired, it is preferred to bond the reinforcing layer to the open cell foam layer prior to the fusing described above, such as by gel lamination. Thus, if a reinforcing layer is desired, the layer should be cast onto the open cell foam layer to the desired thickness prior to fusing. If a decoupling layer is desired, the layer can be fused to the open cell foam layer prior to the fusing of the barrier layer described above. Alternatively, the decoupling layer can be bonded to the open cell foam layer after the fusing to the barrier layer. After the complete fusion and/or lamination of the layers, the sound attenuation composite is cooled and stripped off the release paper of belt and wound up into a continuous roll.

Figure 7:
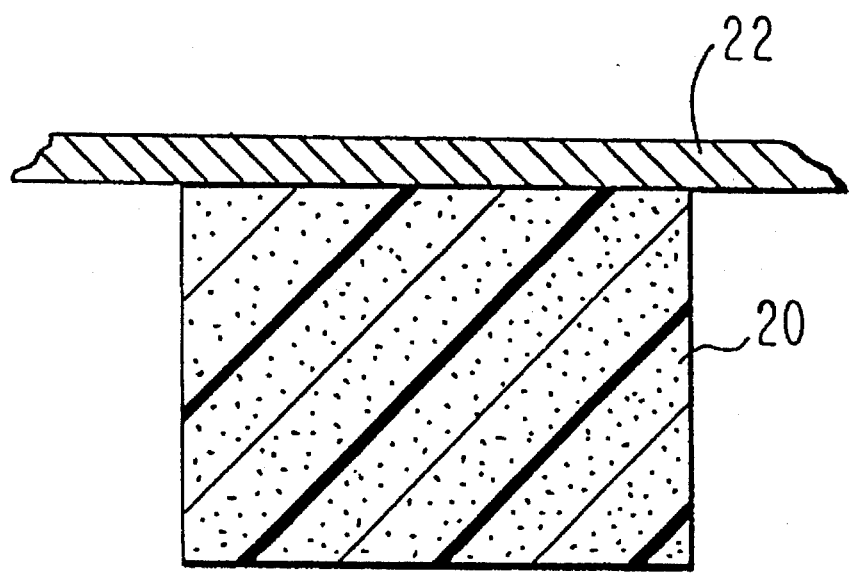
FIG. 7 is a cross-sectional view of an acoustical foam sound attenuation barrier secured to a support structure.

Referring to FIG. 7, an alternative embodiment of the sound attenuation composite of the present invention is shown. In this embodiment, an unsupported acoustical foam 20 having similar characteristics as the open cell foam layer described above, is secured to support member 22. The foam 20 may be secured to the support member 22 using adhesives, screws or like fastening materials. Support member 22 functions in a similar manner as the barrier layer described above, i.e., the support member reflects sound energy into the foam 20. The support member may be the sheet metal of a structure, such as an automobile or construction equipment, or the support member may be constructed from fiberglass. However, various types of materials for the support member are contemplated. The composite when attached to the support member provides extraordinary damping qualities so that vibration induced noise or sound energy is substantially reduced.

EXAMPLE 1

A polyvinyl chloride plastisol formulation was compounded employing the following ingredients:

| Raw materials | Function | Parts by Weight |
|---|---|---|
| TPG-10 Green | Pigment paste | 0.99 |
| Thermoguard CPA | Flammability additive | 0.73 |
| Triton 114 | Surfactant | 1.07 |
| GEON 178 | Polyvinyl chloride | 12.19 |
| FORMOLON 40 | Polyvinyl chloride | 2.44 |
| H-150 | Plasticizer | 9.60 |
| Mineral Spirits | Viscosity control | 2.68 |
| Barium Sulfate (W-125) | Filler | 61.57 |
| Microspheres (K-1) | Filler-lower density | 1.27 |
| Thermchek 1776 | Heat stability and synergistic action of metallic and nonmetallic stabilizing | 0.47 |
| Thermchek 904 | Heat stability-organic inhibitor | 0.15 |
| Frysol CEF | Flame retardant | 1.49 |
| Hydrated Alumina ATH 204 | Flame retardant filler | 1.47 |
| Desical | Improves internal adhesion of PVC to the filler and substrates | 0.44 |
| Silicone DC Surfactant 1250 | froth stabilizer | 3.47 |

All the ingredients were mixed uniformly except for the silicone and surfactant which were added prior to foaming. The resultant mixture formed a uniform paste which was then mechanically frothed to a density of approximately 65 to 75 lbs/ft$^3$ to form an open cell foam layer of approximately 55 mils in thickness. Exemplary frothing conditions, i.e., the settings for the Oakes mixer, to achieve the irregular open cell structure are shown below:

| | |
|---|---|
| Pump setting | 20 lbs. |
| Rotor speed | 4.5 rpm |
| Air regulator | 70 psi |
| Flow meter | .25 |
| Water pressure | 20 psi |
| Foam pressure | 60 psi |
| Cup weight | 95 gms |

A polyvinyl chloride barrier formulation was compounded employing the following ingredients:

| Raw materials | Function | Parts by Weight |
|---|---|---|
| AL Flake Grade 2000 | Metallic flake pigment | 0.49 |
| Thermoguard CPA | Flammability additive | 0.79 |
| Triton 114 | Surfactant | 1.15 |
| GEON 178 | Polyvinyl chloride | 13.12 |
| FORMOLON 40 | Polyvinyl chloride | 2.63 |
| H-150 | Plasticizer | 10.41 |
| Mineral Spirits | Viscosity control | 0.86 |
| Barium Sulfate (W-125) | Filler | 66.28 |
| Thermchek 1776 | Heat stability and synergistic action of metallic and nonmetallic stabilizing | 0.47 |
| Thermchek 904 | Heat stability-organic inhibitor | 0.16 |
| Frysol CEF | Flame retardant | 1.60 |
| Hydrated Alumina ATH 204 | Flame retardant filler | 1.57 |
| Desical | Improves internal adhesion of PVC to the filler and substrates | 0.47 |

A PVC barrier layer of approximately 20 mils in thickness was cast onto a release paper and the open cell foam layer was cast over the PVC barrier layer. The two layers were fused in an oven at a temperature of about 425° F. for approximately 3 minutes. The composite was then cooled, stripped from the release paper and wound into a continuous roll.

EXAMPLE 2

The process of Example 1 is repeated with an additional reinforcing layer composed of polyester scrim of 10 mils thickness being prepared and cast as follows:

The polyester scrim is gel laminated onto the open cell foam layer by laying it into the foam and fusing at a temperature of 425° F.

It will be understood that various modifications can be made to the embodiments of the present invention herein disclosed without departing from the spirit and scope thereof. For example, various types of polymers are contemplated, as well as various types of construction configurations for the composite. Therefore, the above description should not be construed as limiting the invention but merely as exemplifications of preferred embodiments thereof. Those skilled in the art will envision other modifications within the scope and spirit of the present invention as defined by the claims appended hereto.

What is claimed is:

1. A method for forming a sound attenuation composite comprising:

casting a solid polymer barrier layer on release paper;

forming a polymer open cell foam layer casting said open cell foam layer onto said solid barrier layer;

fusing said open cell foam layer to said barrier layer to form the sound attenuation barrier composite; and casting a reinforcing layer onto said open cell foam layer prior to fusing said open cell layer to said barrier layer for dimensionally stabilizing the composite.

2. The method according to claim 1 further comprising cooling said fused layers and removing said composite from said release paper.

3. The method according to claim 1 further comprising affixing a decoupling layer to said open cell foam layer.

4. The method according to claim 1, wherein said open cell foam layer is formed by mechanical frothing in a manner to form an irregular open cell structure.

5. A method for foaming a sound attenuation composite comprising:

casting a solid polymer barrier layer on release paper;

forming a polymer open cell foam layer, the open cell foam layer being filled with glass microsphere filler;

casting said open cell foam layer onto said solid barrier layer fusing said open cell foam layer to said barrier layer to form the sound attenuation barrier composite; and casting a reinforcing layer onto said open cell foam layer prior to fusing said open cell foam layer to said barrier layer for dimensionally stabilizing the composite.

6. The method according to claim 5 further comprising cooling said fused layers and removing said composite from said release paper.

7. The method according to claim 5 further comprising affixing a decoupling layer to said open cell foam layer.

8. The method according to claim 5, wherein said open cell foam layer is formed by mechanical frothing in a manner to form an irregular open cell structure.

* * * * *